Sept. 11, 1934.  W. E. SHORE  1,973,019

ELECTRIC MOTOR COMPRESSOR

Filed May 22, 1933   3 Sheets-Sheet 1

Inventor.
William E. Shore.

Sept. 11, 1934. W. E. SHORE 1,973,019
ELECTRIC MOTOR COMPRESSOR
Filed May 22, 1933 3 Sheets-Sheet 2

Inventor:
William E. Shore.

Sept. 11, 1934. W. E. SHORE 1,973,019

ELECTRIC MOTOR COMPRESSOR

Filed May 22, 1933   3 Sheets-Sheet 3

Inventor.
William E. Shore.

Patented Sept. 11, 1934

1,973,019

UNITED STATES PATENT OFFICE 1,973,019

ELECTRIC MOTOR COMPRESSOR

William E. Shore, Staten Island, N. Y.

Application May 22, 1933, Serial No. 672,135

16 Claims. (Cl. 230—75)

The principal objects of this invention are to provide a compact unitary mechanism for producing fluid pressure or vacua in which the operating compressing elements are incorporated in and completely enclosed within the electric motor structure in such a manner as to effectively seal the fluids or gases being used from leakage to atmosphere.

A further object is to produce an apparatus which will operate without noise and, having a minimum of working parts, will operate for extremely long periods without requiring attention.

A still further object is to devise a motor structure which, while having its operating parts completely enclosed, will however readily dissipate heat generated in its fields by radiation.

The principal features of the invention consist in the novel construction and arrangement of parts whereby the rotor of the motor device is utilized as a fluid impeller within a sealed casing whereby a liquid agent is utilized as a compressing element to displace a secondary liquid or gas and thereby produce an effective suction and discharge of the secondary element in either closed or open fluid circuits.

A further and important feature consists in the novel use of a liquid means as the electrical inductor element, either wholly or partially, in an enclosed electrically-operated rotor and in utilizing such liquid element to perform the service of a compressing agent.

In the accompanying drawings, Figure 1 is a vertical section of my motor compressor taken on the line 1—1 of Figure 2.

Figure 1:
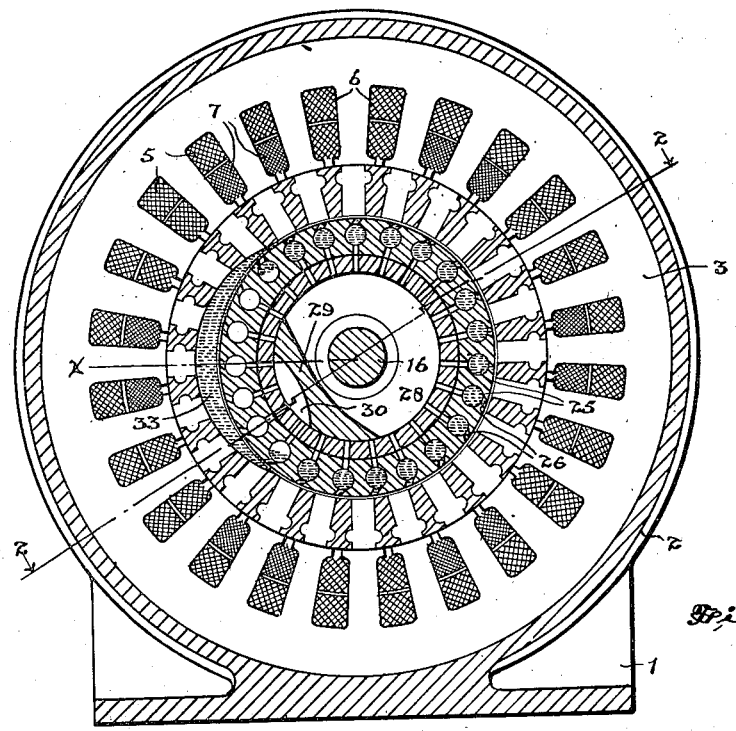

In the form of the invention illustrated in the accompanying drawings, the base 1 supports a rigid cylindrical housing 2 in which is mounted the circular stator field laminations 3 which are secured between the outer plates 4.

5 are the stator field windings arranged in the slots 6 formed in the laminations 3. These windings are of the conventional type and may be varied to suit whatever requirements may be desired and with these windings may be arranged suitable starting windings 7.

These field windings are connected to a suitable form of centrifugal switch or make and break time switch, but such is not illustrated as it is common practice in the electrical art of winding and equipping induction motors.

Fitting snugly into the central cylindrical bore 8 of the field structure, is a cylindrical element formed of the ring-shaped laminations 9 which are ground to fit and form a continuation to complete the field laminations 3 in such a manner that the magnetic connections between them may be considered complete.

The laminations 9 are held on either side by the ring-shaped members 10.

Cylindrical end closure members 11 are fitted tightly within the rings 10 provided with flanges 12 abutting the outside of the rings to which they are secured by suitable bolts.

A centrol boss 13 is arranged on each of the members 11 and these are formed with cylindrical recesses housing the ball-bearings 14, the outer ends being sealed by the threaded caps 15.

A shaft 16 completely enclosed between the cap members, is supported in the bearings 14.

A circular recess 17 formed in each of the members 11 contains a suitable felt packing to prevent the lubricant housed in the bearing ends from leaking through to the central portion of the machine.

Each of the members 11 is provided with a circular recess 18 surrounding the shaft 16 and this recess is open to the central cavity of the device through the narrow clearance passage 19 surrounding the shaft.

A circular member 20 is rigidly secured upon the shaft 16 centrally of its length and is formed with the laterally-extending flanges 21 which extend into circular recesses formed in the inner faces of the cylindrical members 11 and are a close running fit therewith.

A plurality of ring laminations 23 are mounted on the central portion of the member 20 to coincide with the laminations 9 and 3, and the outer perimeter of the ring laminations 23 fit closely to the stationary laminations 9 but provide a running fit therewith. The laminations 23 are secured upon the member 20 by rings 24 threaded thereon. These outer rings form a running fit with the adjacent surfaces of the recesses 18 in the end members 11 and also with the inner perimeter of the metal rings 10.

The rotor thus formed is provided with a plurality of transverse channels 25 equally spaced circumferentially around the rotor and extending through the laminations 23 and into the end rings 24. The outer periphery of the rotor formed by the ring laminations 23 is slotted from end to end with slots 26 which cut into the transverse channels 25 and these slots are sloped in the direction of travel of the rotor.

Radial ports 27 are bored through the flanges 21 and rings 24 of the rotor to intersect the ends of the channels 25, these ports communicating with the central chamber 28 of the rotor.

Each of the end members 11 is provided with a projection 29 which extends past the row of radial ports 27 on the inside of the flange of the rotor and the outer surface of the projection forms a sealing surface at both sides in a circumferential direction.

A recess 30 is provided in the face of the projection 29 adjacent to the rotor flange, which communicates with the ports 27 and leads outwardly through a passage 31 extending through the cylindrical closure members and forms the inlet for the fluid to be operated upon.

Figure 2:
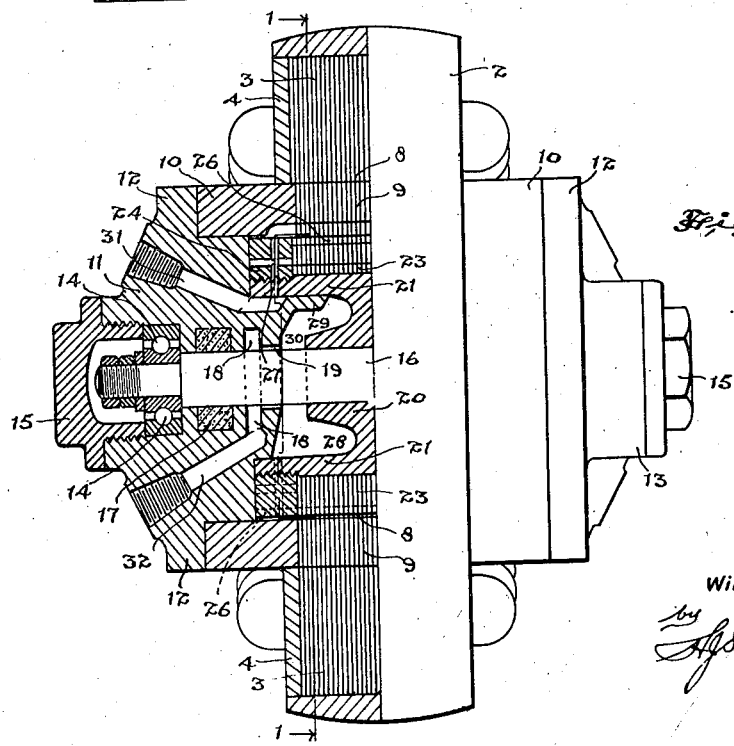
Figure 2 is a part side elevation and half section of the device taken on the line 2—2 of Figure 1.
Figure 3:
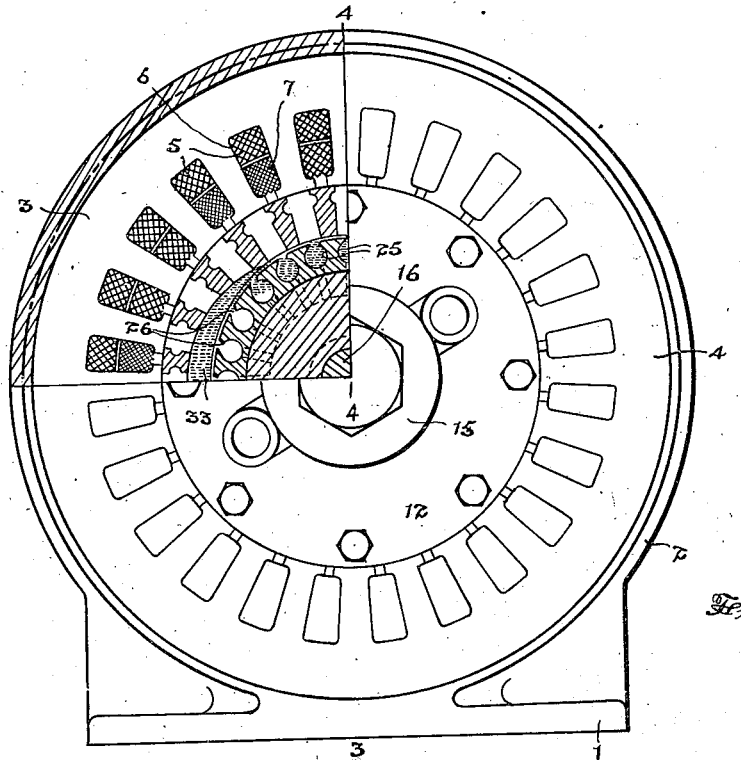
Figure 3 is a part end elevation and upper quarter section of the device taken on the line 3—3 of Figure 4.
Figure 4:
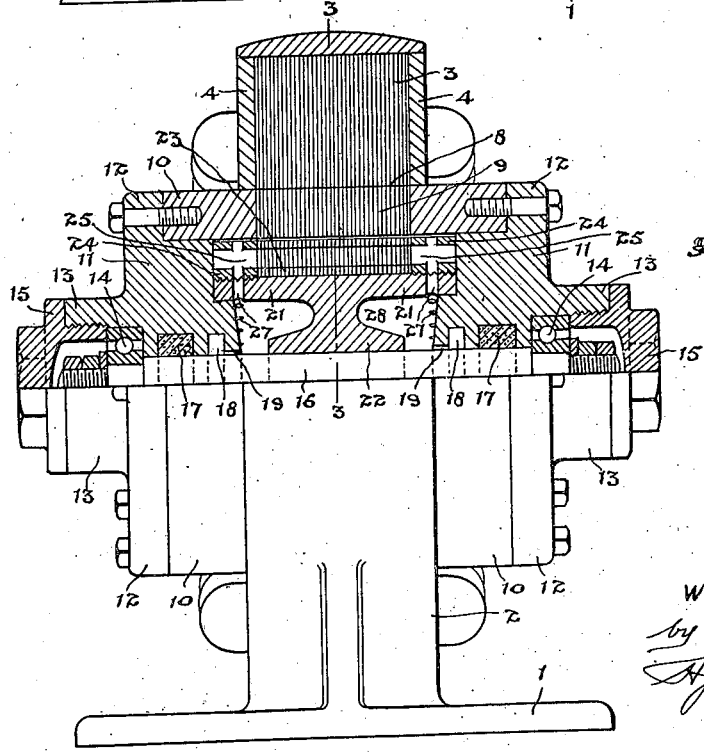
Figure 4 is a part side elevation and half longitudinal section of the device taken on the line 4—4 of Figure 3.
Figure 5:
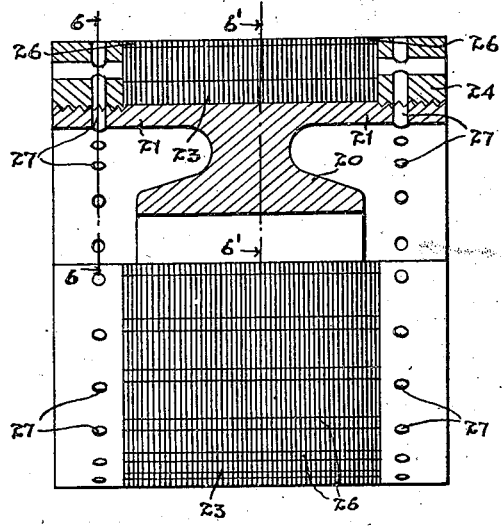
Figure 5 is a part side elevation and half longitudinal mid-section of the rotor removed from its casing.
Figure 6:
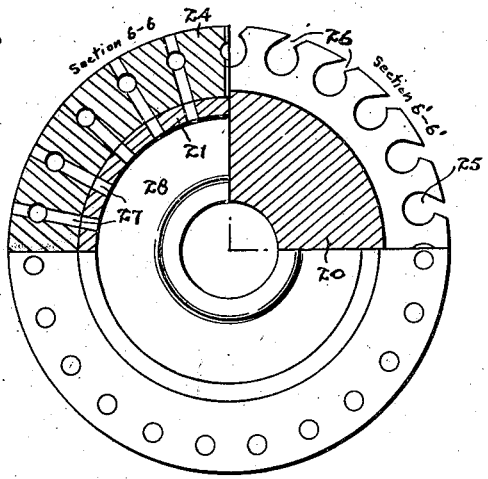
Figure 6 is a part end elevation of the rotor showing quarter sections on the line 6—6 and 6'—6' of Figure 5.

A passage 32, as illustrated in Figure 2, connects with a circular recess 18 surrounding the shaft at each end and leads outwardly to the end closure members 11 and forms a discharge outlet. The outlet passages 32 communicate with the central chamber 28 in the rotor through the medium of the clearance passages 19 and circular recesses 18, so that any fluid pressure existing in the central chamber will flow to the discharge passages. The inlet passages communicate only with the central recesses 30 in the projections 29, consequently the gases entering the inlet find communication with the interior of the rotor chamber only through the ports 27 as they pass over the inlet recesses 30.

The inner periphery of the cylindrical member formed by the laminations 9 and rings 10 is cut away eccentrically at one side forming a crescent-shaped chamber 33. One end of this crescent-shaped chamber is substantially in radial alignment with one end of the inlet recess 30 so that as each of the radial ports 27 moves into communication with the recess 30, it also communicates through its corresponding transverse channel 25 and slot 26 with the commencement end of the crescent chamber. The crescent-shaped chamber continues to a point where the radial ports 27 are still in communication therewith after the inner ends thereof have cleared the valving projection member 29.

When the structure thus described has been assembled, a quantity of mercury is inserted through the inlet passage to fill the depression or crescent chamber 33 and all of the transverse channels 25 and slots 26, except those in communication with the crescent chamber, when the rotor is in operation. The proper quantity can of course be readily determined so that there will be only sufficient mercury to fill the depression or crescent chamber 33 so that the mercury just touches the outer surface of the rotor at the neutral line X or substantially at the point of cut-off of the intake when the machine is in operation.

With the proper quantity of mercury in the machine the mercury flows into the transverse channels 25 in the lower half thereof and upon the application of power in the form of electrical energy, electrical conduction occurs through the mercury standing in the transverse channels, and the circuit is completed through the mercury and the copper rings 24.

The action of the magneto-motive force on the mercury causes the rotor to pick up speed and the mercury, by the action of centrifugal force, commences to flow from the interior of the central chamber 28 and out through the radial ports 27 to the channels 25 and slots 26. This continues until all the mercury is revolving with the rotor which causes the completed mercury circuit to operate in the same manner as the ordinary squirrel-cage type of rotor does with the standard solid metal bars when the fields are first tested.

It will be noted that the mercury forms a fluid seal around the periphery of the rotor and that when the transverse channels and slots 26 in their progressive motion open communication with the chamber 33 the centrifugal action causes the mercury contained within the slots and channels to flow outwardly into the chamber 33. Simultaneous with this outward movement of the mercury, the inner ends of the ports 27 open communication with the intake passage and consequently a suction is created which draws in a gas or liquid which is to be operated upon.

Several of the ports 27 with their communicating passages become progressively charged with the indrawn gas or fluid, and the continued rotation of the rotor moving the ports 27 past the intake recess, become closed.

The further rotary movement of the rotor causes the inner ends of the ports 27 to move past the projection 29 and to open to the central chamber 28.

It will be noted that when the inner ends of the ports have cleared the central valving projection 29, the outer periphery of the crescent-shaped chamber converges. This forces the mercury inwardly to gradually fill up the slots 26 and transverse channels 25 until, when the point of closure of the slots 26 by the cylindrical surface of the laminations 9 and rings 10 surrounding the rotor is reached, the said transverse channels and slots will be filled with mercury and the liquid or gas which previously filled the space, will have been discharged to the central chamber 28.

The very rapid movement of the rotor causes a continuous suction of air or gas into the intake passage and a continuous discharge under compression into the central chamber 28. The pressure exerted is of course determined by the resistance to the discharge, but on account of the incompressible quality of the mercury a very positive result is achieved.

It will be readily appreciated that all compression taking place by reason of the forcing inward of the mercury at the end of the crescent chamber 33 to the progressively-travelling transverse channels 25 and slots 26, is completely sealed. The mercury provides a seal at the perimeter of the rotor and also at the ends where the end surfaces of the rings 24 run in the circular recesses 18, thus the fluid which has been compressed is sealed against escape around the perimeter of the rotor and it is therefore confined to the central chamber 28.

From this description it will be understood that all the working surfaces of the rotor are sealed with a film of mercury, consequently there can be no leakage of gases or fluids through the mercury to the field laminations or to any other exit except the discharge provided.

It will of course be necessary to construct the cylindrical member formed by the metal laminations 9 and metal rings 10 so that it is gas and mercury-tight. The same also applies to the seal between the metal rings 10 and the end closure members 11. The lubricant for the bearings of the rotor is enclosed within sealed cavities and there will be no tendency for the lubricant to leak past the felt packing rings 17 because the central chamber 28 is continually under pressure when the machine is in operation.

The device herein described is a hermetically-sealed unit; there are no external mechanical connections between the motor and the driven member and there is no necessity for belts or gears. It is capable of staging one step of compression to another for boosting pressure to a high degree without difficulty of atmospheric leakage and it is also capable of producing a high vacuum and two or more of these units may be connected to stage from one to another. Under these circumstances it will be readily appreciated that the device may be utilized for displacing poisonous gases or liquids with perfect safety.

It may be found desirable to amplify the starting or operating torque of this device by the provision of copper inductors in the rotor reducing the rotor resistance so that it will actuate in a manner similar to a common "squirrel-cage" rotor which will ensure the rotor turning upon its shaft without dependence upon the presence of the mercury so that when the motor is stationary and the mercury has fallen to the bottom of the machine, induction takes place upon the turning on of the current through the copper inductors and the rotor thus will gain speed before the mercury has filled up all of the slots. This provision is important where a motor of a split phase type, or that which carries a starting winding, is used.

Figure 7:
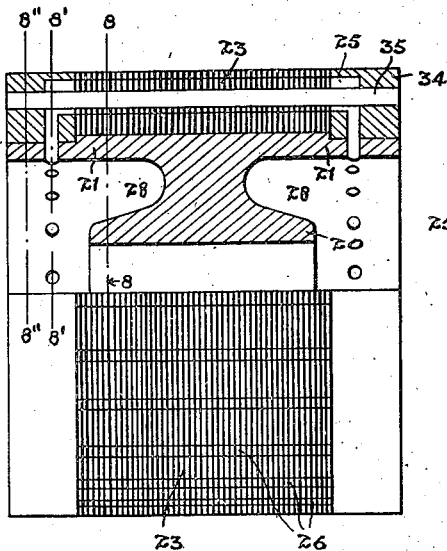
Figure 7 is a part side elevation and half longitudinal mid-section of a modified form of rotor.
Figure 8:
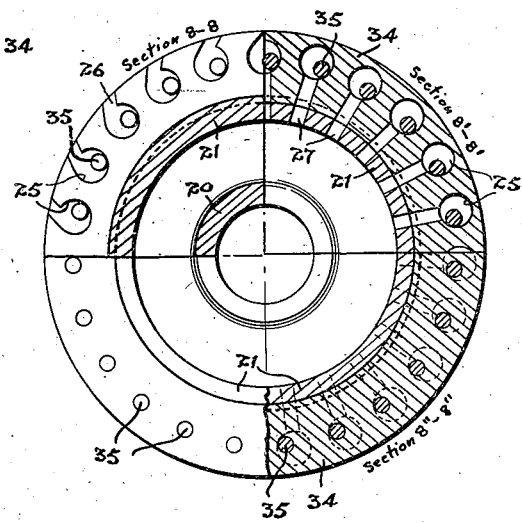
Figure 8 is a part end elevation of the rotor shown in Figure 7 showing quarter sections on the lines 8—8, 8'—8' and 8"—8" of Figure 7.

Figures 7 and 8 of the drawings illustrate a modification in the structure of the rotor to accomplish this latter feature. In this structure the copper rings 34 are fitted tightly over the flanges 21 of the circular member 20 of the rotor and copper rods 35 extend through the rings and through the transverse channel 25 in the laminated portion. The copper rods may be soldered or brazed or riveted securely in place.

The rods are placed in the transverse channel 25 preferably to the forward side thereof in the direction of rotation of the rotor so that they will not interfere with the free movement of the mercury and so that they will not obstruct the free flow of the mercury in the radial ports 27.

The arrangement of these copper rods assists materially in the starting of the motor, therefore ensuring the rapid assumption of the maximum speed to cause the centrifugal flowing of the mercury through the radial channels or ports to fill the slots and transverse channels.

It is desirable in the construction of this device that the rings 10 enclosing the laminations 9 surrounding the rotor be of a sensibly electrically non-conducting material. A material of high resistance may be found more desirable on account of the requirement for strength, it being only necessary that this enclosing casing surrounding the rotor is both air and liquid tight.

The use of mercury as the compressing element is very desirable as it is of high specific gravity and will continue the velocity imparted to it by the rotation of the rotor through the crescent-shaped chamber 33 and it will therefore act with remarkable efficiency in compressing a lighter fluid or gases, and as it is an electrical conductor of exceptional value, it performs the service of the induction element of a "squirrel-cage" rotor.

With the form of rotor shown in Figures 7 and 8 it may be possible to utilize a different fluid from mercury which might be detrimental to the use of the device for certain gases or liquids.

What I claim as my invention is:—

1. An electric motor compressor having a motor rotor acting as an impeller, said rotor having a primary fluid associated therewith, a casing surrounding said motor rotor and co-operating therewith and with said primary fluid medium to retain the fluid medium in variable co-operating contact with said motor rotor and casing, and means for directing a secondary fluid into the zone of operation of the impeller to be acted upon by the primary fluid medium.

2. An electric motor compressor, comprising an induction motor having its rotor enclosed within a fluid tight casing and formed with fluid passages, means for directing a fluid to be compressed into the said passages, fluid means carried by said rotor for compressing a lighter fluid, and means for discharging the compressed fluid.

3. An electric motor compressor, comprising a stationary field structure having a sealed liquid tight chamber, a rotor of the "squirrel cage" type rotatably mounted within said sealed chamber and having impeller formations containing a fluid compressing agent, means for directing the liquid compressing agent into compressing relation with said impeller structure, means for directing a secondary fluid into said impeller structure to be compressed and means for directing the compressed fluid from said impeller structure.

4. An electric motor compressor, comprising a stationary field structure having a liquid tight cylindrical chamber formed with an eccentric recess at one side thereof, a cylindrical rotor journalled in said cylindrical recess and forming a running fit therein, a plurality of recesses extending through the periphery of said rotor, a liquid occupying the recesses in said rotor and forming a liquid seal between the rotor and its enclosing casing, means for directing a fluid into said rotor openings to be compressed by the sealing liquid and means for directing the compressed fluid from the rotor structure.

5. An electric motor compressor, comprising a stationary field structure having a liquid tight cylindrical chamber formed with an eccentric recess at one side thereof, a cylindrical rotor journalled in said cylindrical recess and forming a running fit therein, a plurality of recesses extending through the periphery of said rotor, a liquid occupying the recesses in said rotor and forming a liquid seal between the rotor and its enclosing casing, said liquid being an electrical conductor and forming an inductance element of said rotor, means for directing a fluid to be compressed into the openings in said rotor, and means for directing the compressed fluid from the rotor.

6. An electric motor compressor, comprising a circular field structure having a hollow cylindrical central portion closed at the ends, a shaft mounted in bearings centrally of said cylindrical portion of the field structure and sealed therewithin, a rotor mounted on said shaft having a plurality of parallelly arranged longitudinal peripheral recesses, means sealing the ends of said rotor, ports extending through the rotor communicating with said recesses, valving means co-operating with said ports in the rotation of the rotor, fluid means filling said recesses in the rotation of the rotor and sealing its perimeter, an inlet port communicating with said valving means, and an outlet port leading from the centre of the rotor.

7. An electric motor compressor, comprising a circular field structure, a cylindrical member forming a continuation of the field structure and rigidly secured therein having a central laminated portion and closed ends, said closed ends each having annular channels, bearings sealed within said enclosed ends, a shaft mounted in said bearings, a rotor mounted on said shaft having flanges extending into the annular recesses in said end closures, copper rings mounted on said rotor flanges at the ends, annular laminations arranged between said copper rings, ports extending radially through said flanges and rings, longitudinal recesses having ports at opposite ends of said rotor, stationary valving members extending from the end members of the cylindrical field portion and forming valving elements covering a group of the radial ports in the rotor, said valving members having inlet passages, outlet passages leading from the cylindrical field member beyond the valving members, an eccentric cavity formed in the wall of the stationary cylindrical portion opening to the ports of the rotor passing the inlet passage and also communicating with ports of the rotor beyond the valving members, and a liquid compressing agent filling the longitudinal recesses in the rotor and forming a liquid seal.

8. An electric motor compressor, comprising a field structure having a cylindrical portion enclosing a sealed chamber, said chamber having an eccentric enlargement extending from end to end thereof, a hollow rotor journalled within said sealed chamber and having a plurality of longitudinally arranged and parallelly disposed peripheral cavities, ports extending radially inward from said cavities, a fluid electrical conductor centrifugally retained in said cavities and forming the inductors of the rotor, means provided in the cylindrical portion of the casing for evacuating the conductor fluid successively from said cavities, means for effecting the return of said evacuated fluid to said cavities during the rotation of the rotor, means for directing a lighter fluid into the evacuated cavities, means for entrapping the lighter fluid in said cavities, and means for discharging the lighter fluid under pressure from said cavities in the rotative movement of the rotor.

9. An electric motor compressor, comprising a cylindical field structure enclosing a sealed chamber, a rotor journalled within said sealed chamber having a plurality of parallelly arranged peripheral cavities extending longitudinally thereof, metallic inductors arranged within said longitudinal cavities in said rotor, a non-compressible fluid arranged within said cylindrical chamber and adapted to fill said rotor cavities during the rotation of the rotor, means arranged in the wall of the cylindrical chamber external to the rotor for effecting the evacuation of the non-compressible liquid from said cavities successively and to effect the return of said liquid progressively following the evacuation, ports leading from said cavities in the rotor, valving means connecting said ports progressively with the intake during the evacuation period, then closing same and then opening same during the fluid return period.

10. An electric motor compressor, comprising a base, a circular frame, an annular laminated structure within said circular frame, field coils mounted in said laminated structure, a laminated structure fitting within the aforesaid laminations and forming a continuation thereof, caps secured to the latter laminations and forming therewith a cylinder, said caps having end cavities, means sealing said end cavities, journal bearings arranged within said end cavities, a shaft journalled in said bearings and extending through the centre of the cylinder structure, a rotor secured to said shaft and having a flanged perimeter, annular laminations mounted centrally on the perimeter of said rotor, copper rings arranged at the ends of said laminations and rigidly mounted on the flanges of the rotor, radial ports spaced equidistant extending through the flanges and said copper rings, horizontal cavities extending longitudinally of the rotor and communicating individually with the ports at each end thereof, said cavities opening outwardly through the perimeters of the rings and laminations, end recesses in the cylinder closures receiving the edges of the flanges and the copper rings of the rotor and forming a sealing surface therewith, a compressing liquid filling said rotor cavities and forming a liquid seal around the perimeter and the ends of the rotor, an eccentric cavity formed in the inner periphery of the cylindrical field member, projections from the inward sides of the end members extending over the inner peripheries of the rotor flanges and covering progressively a series of the radial ports therein, inlet passages leading through said extensions to communicate with the rotor ports as said ports move into communication with the eccentric recess, said eccentric recess extending beyond the rigid extensions and directing the fluid evacuated from the rotor recesses back into said recesses to compress the fluid drawn through the inlets, and an exhaust port connected with the interior of the rotor.

11. An electric motor compressor having a motor rotor, means co-operating with the rotor of the motor for circulating a primary fluid in a closed cycle about the rotor axis, said means permitting a local centrifugal displacement of the primary fluid during each revolution, and means for utilizing the local centrifugal displacement of the primary fluid to displace a secondary fluid.

12. An electric motor compressor having a motor rotor, means co-operating with the rotor of the motor for circulating a primary fluid in a closed cycle about the rotor axis, means in the path of travel of the primary fluid to permit the same to locally recede from and return toward the periphery of the motor rotor during each revolution thereof, and means for utilizing the return movement of the primary fluid to compress a secondary fluid.

13. An electric motor compressor having a rotor provided with displaceable fluid inductors and means for utilizing the displacement of said fluid inductors to displace a secondary fluid.

14. An electric motor compressor having a rotor provided with centrifugally displaced mercury inductors, and means for directing a secondary fluid into and out of the zone of centrifugal displacement of said inductors to be acted upon thereby.

15. An electric motor displacement device having a rotor provided with displaceable fluid inductors, means forming with said motor and its displaceable inductors low and high pressure chambers, and means for conducting a secondary fluid to and from said low and high pressure chambers.

16. An electric motor displacement device having a hollow rotor formed with peripheral cavities leading to the rotor interior, a fluid medium actuated by the rotation of said rotor to recede from and return to said peripheral cavities, means co-operating with said displaced fluid and with said rotor and sub-dividing the interior of the latter into low and high pressure areas, and means for conducting a secondary fluid to and from said low and high pressure areas.

WILLIAM E. SHORE.